United States Patent
Zhan et al.

(10) Patent No.: US 12,263,625 B1
(45) Date of Patent: Apr. 1, 2025

(54) METHOD FOR PREPARING TENSILE SPECIMEN OF EPOXY STRUCTURAL ADHESIVE AND VIBRATION CURING DEVICE

(71) Applicant: Central South University, Changsha (CN)

(72) Inventors: Lihua Zhan, Changsha (CN); Dechao Zhang, Changsha (CN); Bolin Ma, Changsha (CN); Bang Xiong, Changsha (CN); Shunming Yao, Changsha (CN)

(73) Assignee: Central South University, Changsha (CN)

( * ) Notice: Subject to any disclaimer, the term of this patent is extended or adjusted under 35 U.S.C. 154(b) by 0 days.

(21) Appl. No.: 18/784,643

(22) Filed: Jul. 25, 2024

(30) Foreign Application Priority Data

Jan. 4, 2024 (CN) .......................... 202410012313.2

(51) Int. Cl.
| | |
|---|---|
| B29C 45/56 | (2006.01) |
| B29C 45/00 | (2006.01) |
| B29C 45/73 | (2006.01) |
| B29K 63/00 | (2006.01) |
| B29L 31/40 | (2006.01) |
| G01N 3/08 | (2006.01) |

(52) U.S. Cl.
CPC ........ B29C 45/568 (2013.01); B29C 45/0001 (2013.01); B29C 45/73 (2013.01); *B29K 2063/00* (2013.01); *B29L 2031/40* (2013.01); *G01N 3/08* (2013.01); *G01N 2203/0298* (2013.01)

(58) Field of Classification Search
None
See application file for complete search history.

(56) References Cited

U.S. PATENT DOCUMENTS

2013/0228019 A1    9/2013  Meadows et al.

FOREIGN PATENT DOCUMENTS

| CN | 111253896 A | * | 6/2020 |
| CN | 113429747 A | | 9/2021 |
| CN | 114536623 A | | 5/2022 |

* cited by examiner

*Primary Examiner* — Farah Taufiq
(74) *Attorney, Agent, or Firm* — George D. Morgan

(57) ABSTRACT

The present disclosure discloses a method for preparing a tensile specimen and a vibration curing device. The method includes obtaining a colloid mixture and putting it into a beaker and using a stirring device to stir the colloid mixture mixed evenly. The method further includes putting the colloid mixture into a vacuum dryer, and spraying a release agent on cleaned tensile specimen mold, and using a needle to inject the colloid mixture into a molding groove of the tensile specimen mold and filling the molding groove, fixing the pressing plate and the tensile specimen mold together to form a whole mold, fixing it on a vibration platform of a vibration device, turning on the vibration device to vibrate the whole mold and to heat the whole mold to a predetermined temperature, cooling the whole mold, and demolding the whole mold to obtain the tensile specimen of the structural adhesive.

7 Claims, 6 Drawing Sheets

METHOD FOR PREPARING TENSILE SPECIMEN OF EPOXY STRUCTURAL ADHESIVE AND VIBRATION CURING DEVICE

CROSS-REFERENCE TO RELATED APPLICATIONS

The present disclosure claims priority to Chinese Patent Application No. 202410012313.2 with a title of "a method for preparing an ultra-low temperature tensile specimen of an epoxy structural adhesive and a vibration curing device" filed on Jan. 4, 2024, the entire contents of which are incorporated by reference herein.

TECHNICAL FIELD

The subject matter herein generally relates to a technical field of curing and molding epoxy structural adhesive, and in particular to a method for preparing a tensile specimen of an epoxy structural adhesive and a vibration curing device.

BACKGROUND

Composite pressure vessel has become a preferred fuel storage pressure vessel for liquid hydrogen (−253° C.) and liquid oxygen (−183° C.) in artificial satellites, spacecraft, launch vehicles, etc. As the composite pressure vessel has characteristic of light weight, high strength and good anti-leakage performance. A service environment of the composite pressure vessel is complex and harsh, and a performance requirement of material and a structural adhesive using in an environment with an ultra-low temperature are very high. For example, a connection between a barrel and a bottom cover, a connection between a barrel and a head, and a connection between the head and a bottle mouth of the composite pressure vessel with the structure of "metal lining+composite material layer+metal cladding layer" (application number CN202310298940.2) are taken as the objects. When the composite pressure vessel is loaded, the structural adhesive is required to have sufficient strength and stiffness. Tensile test is one of the important methods for evaluating the adhesive performance of the composite pressure vessel claddings. In order to evaluate the reliability of the composite pressure vessel in a normal or low-temperature environment, the mechanical properties of the structural adhesive, such as tensile strength, elongation at break, elastic modulus, and so on, can be studied. Therefore, it is of great significance to carry out research on the preparation of tensile specimens of an epoxy structural adhesive.

BRIEF DESCRIPTION OF THE DRAWINGS

The drawings are used to provide a further understanding of an embodiment of the present disclosure and constitute a part of the specification. Together with the following specific embodiments, they are used to explain the embodiments of the present disclosure but do not constitute a limitation to the embodiments of the present disclosure. In the drawings.

DETAILED DESCRIPTION OF THE EMBODIMENTS

Figure 1:
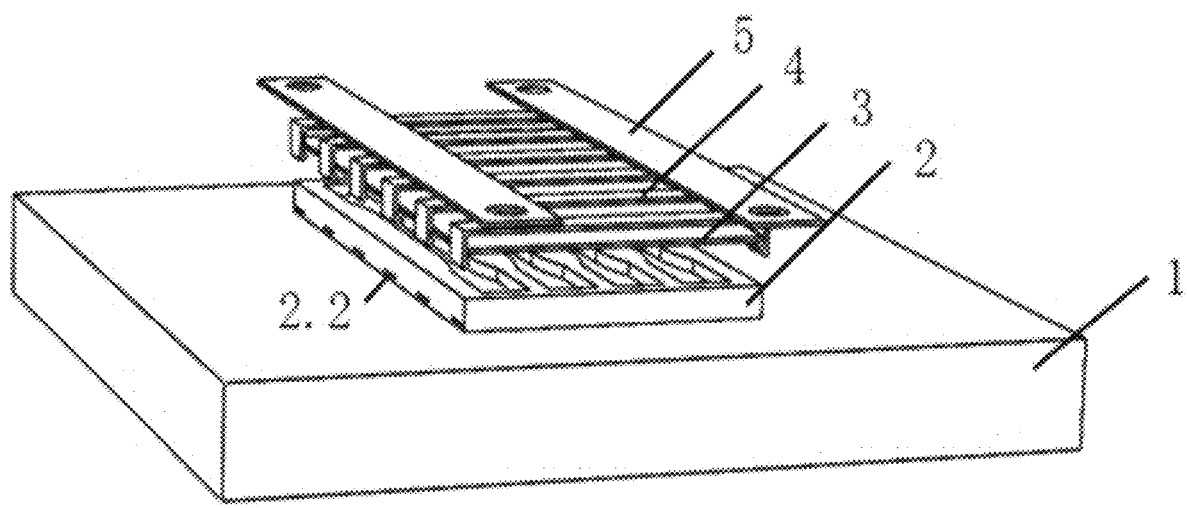
FIG. 1 is a structural diagram of a vibration curing device according to an embodiment of the present disclosure.
Figure 2:
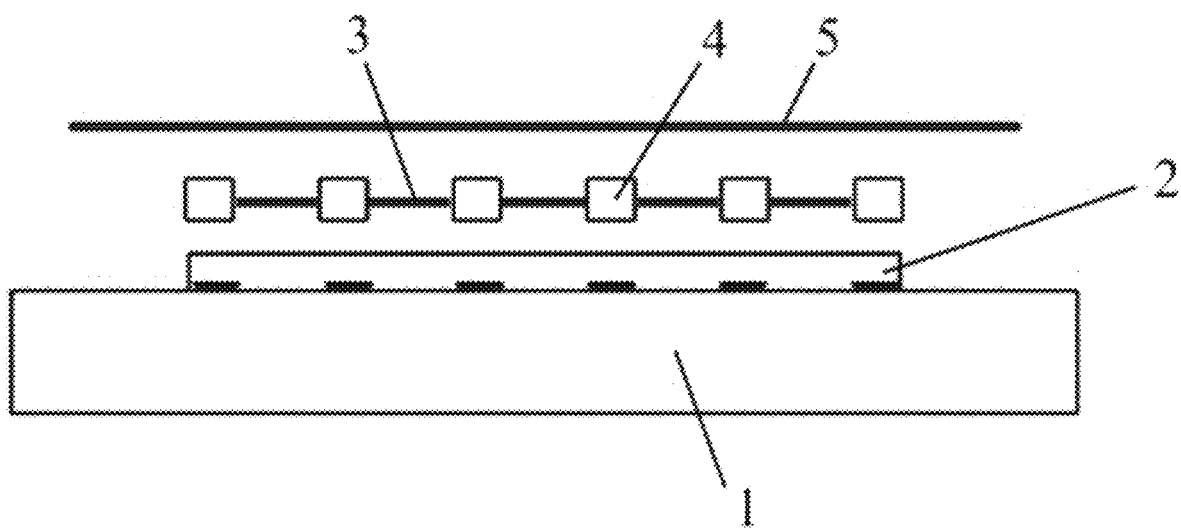
FIG. 2 is a side structural schematic diagram of the vibration curing device in FIG. 1 according to an embodiment of the present disclosure.
Figure 3:
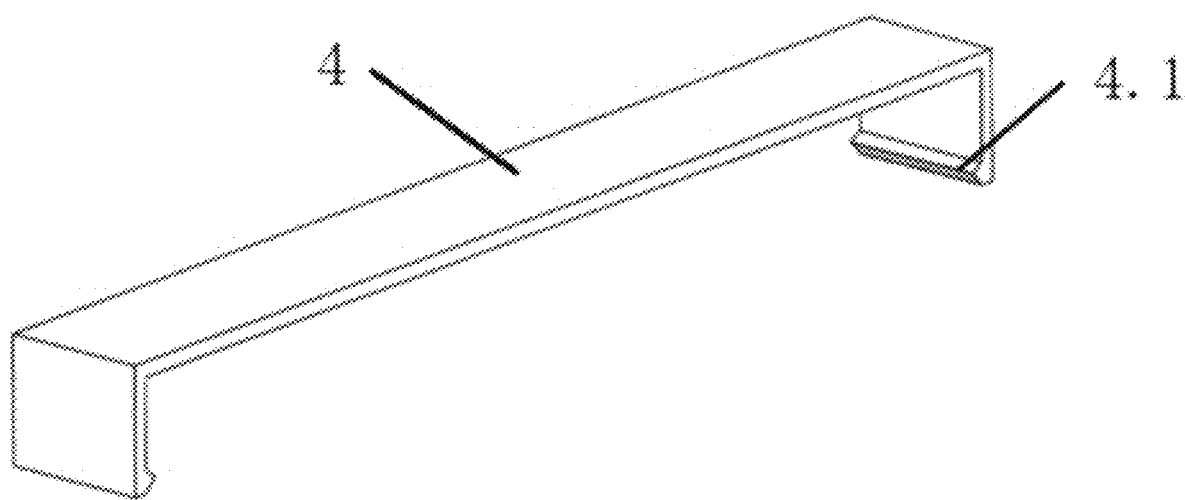
FIG. 3 is a schematic diagram of a three-dimensional structure of a buckle according to an embodiment of the present disclosure.
Figure 4:
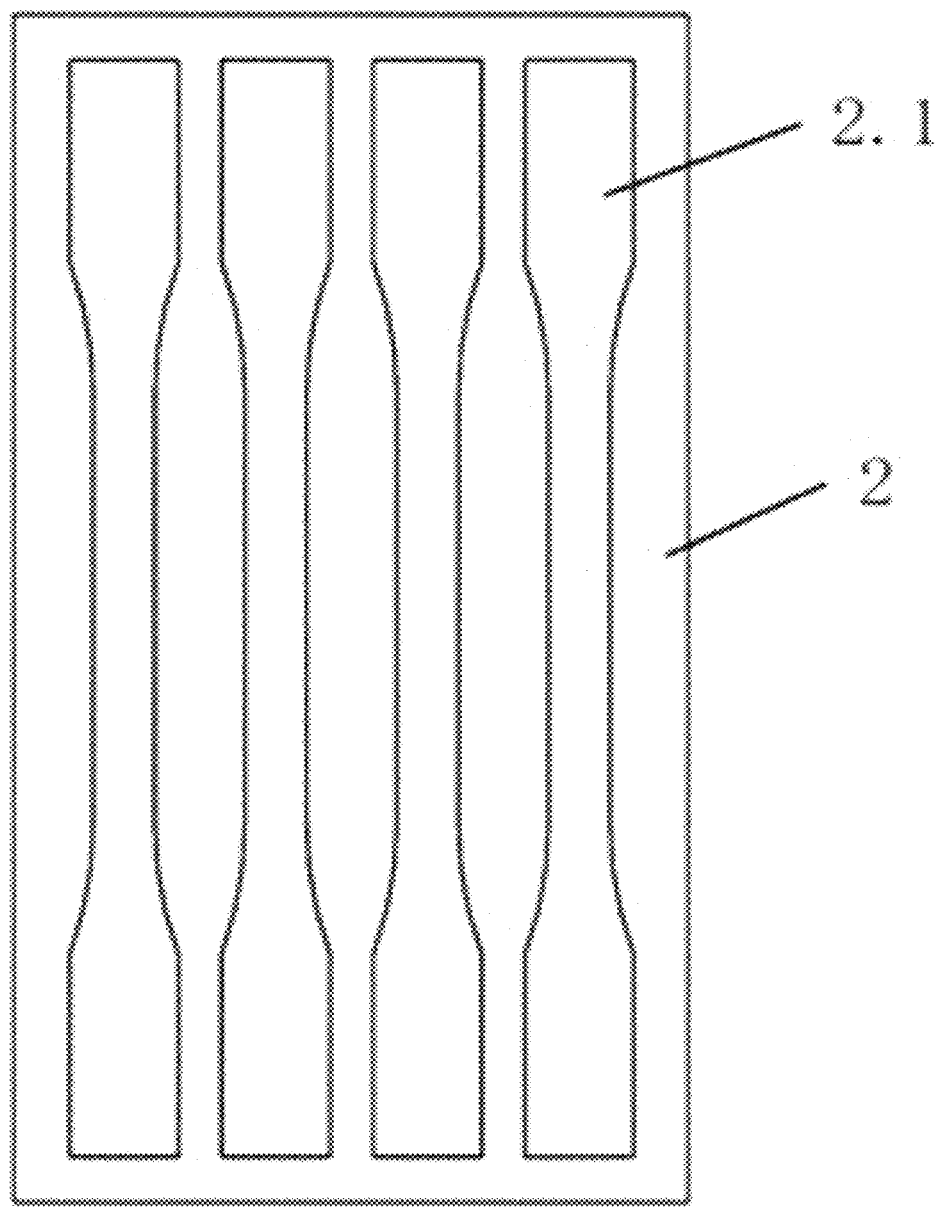
FIG. 4 is a schematic diagram of a top view of a tensile specimen mold according to an embodiment of the present disclosure.

The present disclosure will be described in detail below in conjunction with various embodiments shown in accompanying drawings, but it should be noted that the embodiments are not limitations of the present disclosure, and equivalent conversions or substitutions in functions, methods, or structures made by ordinary technicians in the field according to the embodiments all fall within ae protection scope of the present disclosure.

Referring to FIG. 1 to FIG. 4, an embodiment provides a vibration curing device for preparing a tensile specimen of an epoxy structural adhesive. The tensile specimen of the epoxy structural adhesive is used in an environment with ultra-low temperature. The vibration curing device includes a vibration device 1, a tensile specimen mold 2, a pressing plate 3, a plurality of buckles 4 and a pressing strip 5. A specific structure of the vibration curing device is as follows:

The vibration device 1 includes a vibration platform 1.2 with a heating function, and the vibration device 1 can provide a temperature and mechanical vibration required for curing the epoxy structural adhesive at the same time. The tensile specimen mold 2 is arranged on the vibration platform 1.2, and a plurality of molding grooves 2.1 for curing the tensile specimen of the structural adhesive are provided in the tensile specimen mold 2. The plurality of molding grooves 2.1 are arranged in parallel and spaced apart, and a length direction of the molding grooves 2.1 is consistent with a length direction of the tensile specimen mold 2. A plurality of buckle grooves 2.2 are symmetrically provided at a bottom of both sides of the tensile specimen mold 2. In some embodiments, the tensile specimen mold 2 is made of polytetrafluoroethylene material. The pressing plate 3 is arranged on a top surface of the tensile specimen mold 2, and the pressing plate 3 is made of an aluminum plate with a grade of 3A21 and a thickness of 1 mm. A side of the pressing plate 3 that fits the tensile specimen mold 2 is sprayed with 2-3 layers of release agent to facilitate demolding from the surface of the structural adhesive. The plurality of buckles 4 are used to fix the pressing plate 3 tightly on the tensile specimen mold 2. Both ends of each buckle 4 are provided with a clamping blade 4.1 for engaging with the buckle groove 2.2. The plurality of buckles 4 are arranged on the pressing plate 3 so that the pressing plate 3 and the tensile specimen mold 2 form a whole mold. Among them, a purpose of fixing the pressing plate 3 is mainly to make the surface of the tensile specimen relatively flat after demolding, at the same time, to prevent the structural adhesive from overflowing from the tensile specimen mold 2 during vibration. The pressing strip 5 is arranged on a top of the whole mold and is used to fix the whole mold to the vibration platform 1.2. In this structural setting, the plurality of buckles 4 are arranged in parallel and spaced apart on the pressing plate 3, and a length direction of the buckles 4 is parallel to a width direction of the tensile specimen mold 2.

The whole mold is stably fixed on the vibration platform 1.2 by the pressing strip 5 in a form of bolt locking to ensure that a vibration frequency of the whole mold is the same as a vibration frequency of the vibration platform 1.2.

In a specific embodiment, a plurality of first mounting holes 1.1 for mounting the whole mold are provided on the top of the vibration platform 1.2, and a plurality of second mounting holes 5.1 for matching with the first mounting holes 1.1 are respectively provided at both ends of the pressing strip 5, and the pressing strip 5 is fixedly connected to the vibration platform 1.2 by bolts.

The embodiment provides a method for preparing a tensile specimen of an epoxy structural adhesive using the above-mentioned vibration curing device. The method includes the following steps.

S1, a colloid mixture is obtained by mixing an epoxy resin, an amine-curing agent, and a silane coupling agent. A weight ratio between the epoxy resin and the amine-curing agent is equal to A: B, and a weight ratio between the amine-curing agent and the silane coupling agent is equal to B: C. A is within 5 to 5.3, B is equal to 1, and C is within 0.2 to 0.4. The colloid mixture is put into a beaker, and then the beaker is placed in a water bath furnace with a constant temperature, and a stirring device is used to stir the colloid mixture until the epoxy resin, the amine-curing agent, and the silane coupling agent are mixed evenly, the stirring temperature is within a temperature range of 25° C. to 35° C. As a viscosity of the colloid mixture is the lowest within the temperature range, thereby the colloid mixture is stirred well. A speed for stirring the colloid mixture is within a range of 30 r/min to 35 r/min. If the speed for stirring the colloid mixture is too slow, a time for stirring the colloid mixture will be increased, and a preparation cycle of the epoxy structural adhesive will be increased. If the speed for stirring the colloid mixture is too fast, the epoxy structural adhesive will be easily thrown out of the beaker due to an effect of centrifugal force when the viscosity is relatively low. In one embodiment, the time for stirring the colloid mixture is within a range of 5 minutes to 10 minutes.

S2, the colloid mixture that is evenly mixed is put into a vacuum dryer to remove bubbles generated on the surface of the epoxy structural adhesive, and the vacuum dryer is started to evacuate air with an environment temperature within a temperature range of 25° C. to 35° C. A working pressure inside the vacuum dryer is within −0.2 bar to −0.8 bar, and an evacuation time is within 1 minute to 2 minutes.

S3, Oil stains on the surface of the tensile specimen mold 2 are cleaned by using aviation kerosene and industrial alcohol, and a release agent is sprayed on the cleaned tensile specimen mold 2 twice and three times, and then a needle is used to inject the colloid mixture processed by step S2 into the molding groove 2.1 of the tensile specimen mold 2 and fill the molding groove 2.1. Then, release agent is sprayed on one of the surfaces of the pressing plate 3 twice and three times, and then make the surface sprayed with the release agent close to the upper surface of the tensile specimen mold 2. Then a plurality of blades is embedded in the plurality of buckles 4 into the buckle grooves 2.2 to fix the pressing plate 3 and the whole mold together to form a whole mold. Finally, the whole mold is fixed on the vibration platform 1.2 of the vibration device 1 through the pressing strip 5 to ensure that the whole mold can vibrate at the same frequency as the vibration platform 1.2.

S4, a vibration function of the vibration device 1 is turned on to vibrate the whole mold, an environment temperature for the vibration device 1 is selected to be within 25° C. to 35° C. At the environment temperature, vibration for the whole mold can achieve the best effect. In order to continuously eliminate small bubbles in the structural adhesive, the vibration duration is selected to be within 30 minutes to 60 minutes, and a vibration acceleration is selected to be within 5 g to 10 g. During the vibration of the vibration device 1, the bubbles in the structural adhesive are subjected to the force in the vibration field, and a balance relationship of a pore of the structural adhesive is as follows:

$$P_v - P_r - P_{vibr} = \frac{k\sigma_v}{R_v}. \quad 1)$$

Wherein, $P_v$ represents an internal pressure of the pore, $P_r$ represents a hydrostatic pressure, $P_{vibr}$ represents a pressure caused by the vibration field, k represents a surface tension coefficient, $\sigma_v$ represents a pore surface tension, $R_v$ represents a radius of the pore.

Figure 5:
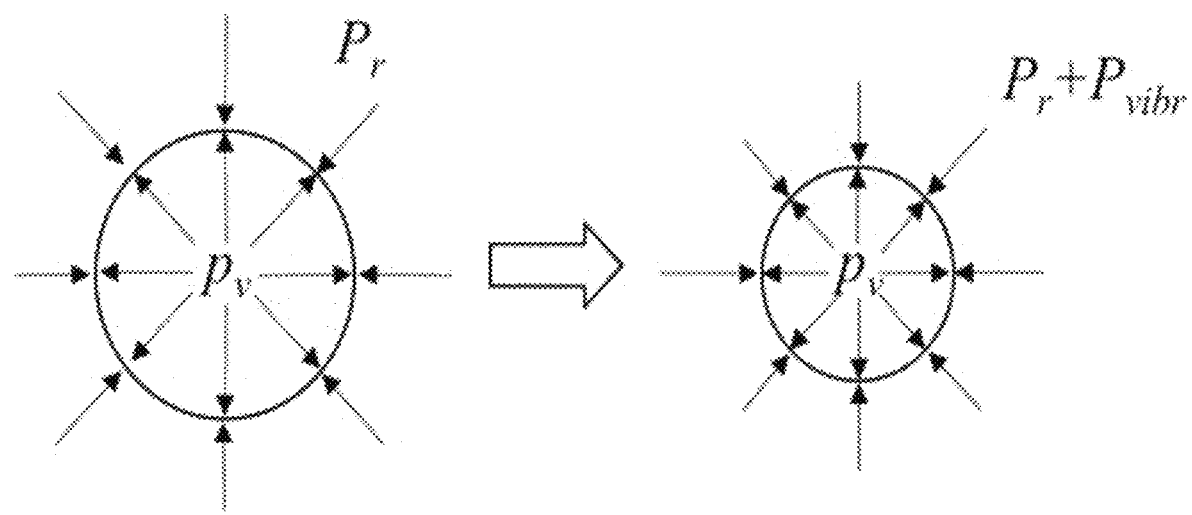
FIG. 5 is a diagram showing a change of a pore in the structural adhesive before and after introduction of a vibration energy field according to an embodiment of the present disclosure.

Under a condition of free of vibration, an internal pressure of the pore inside the whole mold is balanced with an external static pressure of the resin, and the pores exist stably under a certain radius, as shown in FIG. 5. After the vibration energy field is introduced into the present disclosure, an equilibrium equation of the balance relationship existed stably in the pore is broken, and energy excitation generated by the mechanical vibration causes a size of the pore to change. The pores are rapidly reduced or even collapsed under the load generated by the vibration, and the structural adhesive in the tensile specimen mold 2 is further compacted, which can effectively eliminate bubbles in the structural adhesive.

After the vibration is completed, an electric heating function of the vibration device 1 is turned on to heat the whole mold from the environment temperature to a predetermined temperature with a rate of 1-2° C./min, the predetermined temperature is within 55° C. to 65° C., and keep the whole mold warm for 480-550 min; then cool the whole mold with the vibration device 1, and finally demold the whole mold to obtain the tensile specimen of the structural adhesive after vibration curing.

Embodiment 1

A method for preparing a tensile specimen of an epoxy structural adhesive according to the present disclosure includes the following specific steps:

1. a colloid mixture is obtained by mixing an epoxy resin, an amine-curing agent, and a silane coupling agent with a weight ratio of 5:1:0.2. The colloid mixture is put into a beaker with 100 ml, and then the beaker is placed in a water bath furnace with a constant temperature, and a fancy stirring head is used to stir the colloid mixture until the epoxy resin, the amine-curing agent, and the silane coupling agent are mixed evenly, the stirring temperature is 30° C., the speed for stirring the colloid mixture is 30 r/min, and the time for stirring the colloid mixture is 7 minutes.

2. the colloid mixture that is evenly mixed is put into the vacuum dryer and the vacuum dryer is started to evacuate air with a normal temperature, and a working pressure inside the vacuum dryer is within −0.5 bar, and an evacuation time is 1 minute. Oil stains on the surface of the tensile specimen mold 2 are cleaned by using aviation kerosene and industrial alcohol, and a release agent is sprayed on the cleaned tensile specimen mold 2 twice, and then a needle is used to inject the structural adhesive into the molding groove 2.1 of the tensile specimen mold 2 and fill the molding groove 2.1. Then, release agent is sprayed on one of the surfaces of the pressing plate 3 twice, and then make the surface sprayed with the release agent close to the upper surface of the tensile specimen mold 2, and then the plurality of blades is embedded in the plurality of buckles 4 into the buckle grooves 2.2 to fix the tensile specimen mold 2 and the pressing plate 3. Then, the whole mold is stably fixed on the vibration platform 1.2 by the pressing strip 5 and bolts.

3. a vibration function of the vibration device 1 is turned on to vibrate the whole mold, an environment temperature for the vibration device 1 is selected to be 25° C. the vibration time is 30 minutes, and the vibration acceleration is selected to be 5 g. After the vibration is completed, turn on the electric heating function in the vibration device 1, raise the temperature to 60° C. at a heating rate of 1° C./min, and keep warm for 480 minutes; then cool with the vibration device 1, and finally demold to obtain a structural adhesive tensile specimen with good molding quality.

Figure 6:
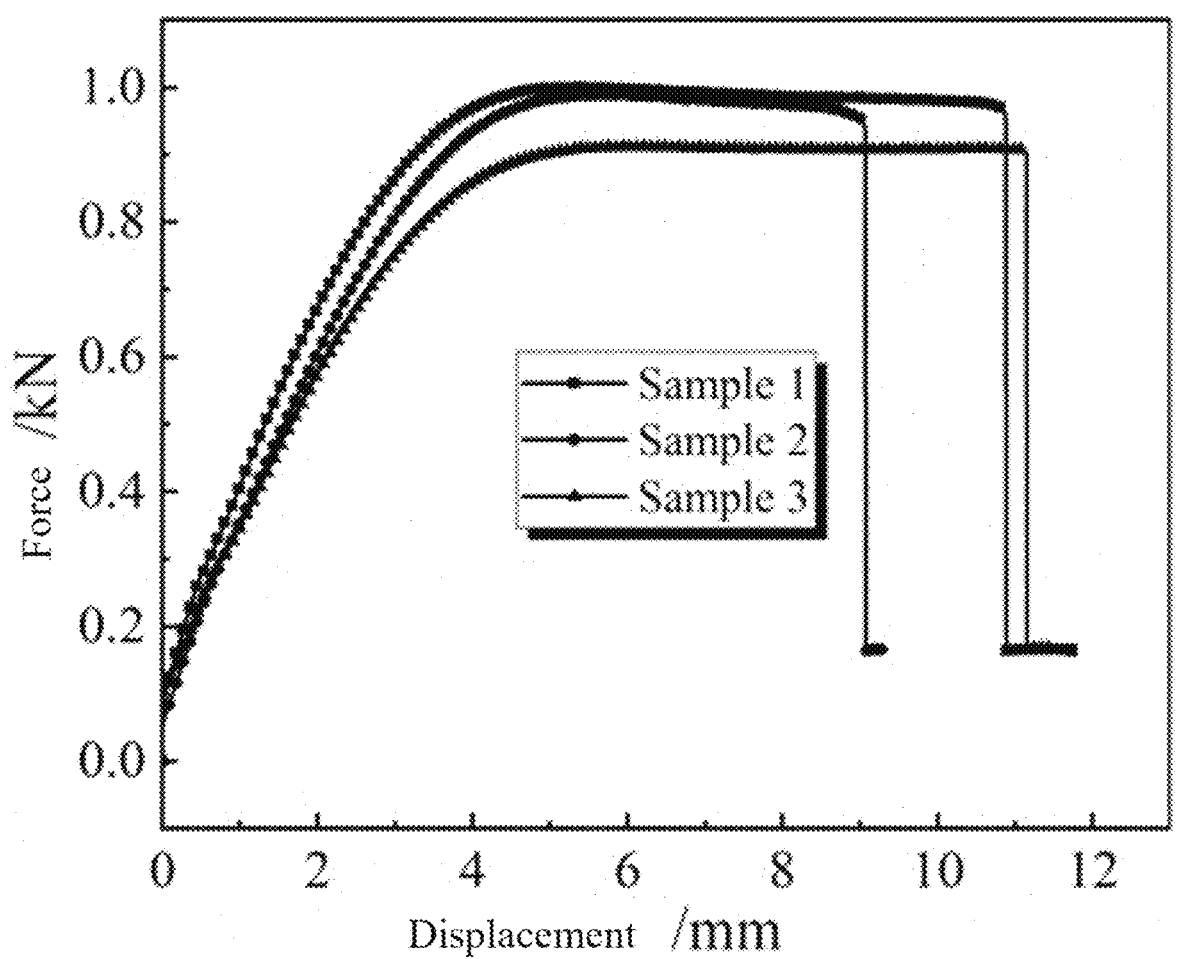
FIG. 6 is a force-displacement curve diagram of testing tensile specimens 1-3 according to an embodiment of the present disclosure.

In order to illustrate an experimental effect of the method for preparing the tensile specimen of the epoxy structural adhesive of the present disclosure. There are three specimens prepared in above embodiment 1 were stretched using an MTS universal tensile testing machine, and the force-displacement curves of the three tensile specimens were measured as shown in FIG. 6. Among them, a size of the specimen and a test method follow GB/T 2567-2021 "Resin Casting Performance Test Method", a lower chuck is fixed during the test, and a speed for stretching an upper chuck is 2 mm/min. The maximum tensile force of the three specimens of the "constant temperature water bath furnace+vacuum dryer+mechanical vibration" combined process of the present disclosure is measured in the experiment as shown in Table 1 below:

TABLE 1

Maximum tensile force of samples of the tensile specimens prepared by the method of the present disclosure

| Sample 1 | Sample 2 | Sample 3 |
|---|---|---|
| 1000 N | 900 N | 911 N |

Comparative Embodiment

The comparative Embodiment adopts a tensile specimen prepared by using a vacuum degassing machine disclosed in a patent application with application number CN202310298940.2 (a preparation method and testing method of a leakage specimen of a high-pressure gas cylinder), and the maximum tensile load is shown in Table 2 below:

TABLE 2

Maximum load of samples of tensile specimen prepared by vacuum degassing process

| Sample 1 | Sample 2 | Sample 3 |
|---|---|---|
| 1169 N | 1052 N | 943 N |

In summary, it can be seen that the mechanical properties of the tensile test prepared by the "constant temperature water bath furnace+vacuum dryer+mechanical vibration" process of the present disclosure are at the same level as the mechanical properties of the tensile test prepared by the vacuum degassing process of the prior art, which effectively verifies the feasibility of the new process of the present disclosure.

The above are only some embodiments of the present disclosure and are not intended to limit the present disclosure. For those skilled in the art, the present disclosure may have various modifications and changes. Any modifications, equivalent substitutions, improvements, etc. made within the spirit and principles of the present disclosure shall be included in the protection scope of the present disclosure.

What is claimed is:

1. A method for preparing a tensile specimen of an epoxy structural adhesive, the method comprising:

obtaining a colloid mixture by mixing an epoxy resin, an amine-curing agent, and a silane coupling agent, and putting the colloid mixture into a beaker, and putting the beaker in a water bath furnace with a constant temperature, and using a stirring device to stir the colloid mixture until the epoxy resin, the amine-curing agent, and the silane coupling agent are mixed evenly, wherein a weight ratio between the epoxy resin and the amine-curing agent is equal to A:B, and a weight ratio between the amine-curing agent and the silane coupling agent is equal to B:C, A is within 5 to 5.3, B is equal to 1, and C is within 0.2 to 0.4;

putting the colloid mixture that is evenly mixed into a vacuum dryer, wherein the vacuum dryer starts to evacuate air with an environment temperature within a temperature range of 25° C. to 35° C., a working pressure inside the vacuum dryer is within −0.2 bar to −0.8 bar, and an evacuation time is within 1 minute to 2 minutes;

cleaning oil stains on a surface of a tensile specimen mold by using aviation kerosene and industrial alcohol, and spraying a release agent on the cleaned tensile specimen mold two times, and using a needle to inject the colloid mixture into a molding groove of the tensile specimen mold and filling the molding groove, putting a pressing plate sprayed with release agent on the tensile specimen mold, fixing a plurality of buckles with the tensile specimen mold to fix the pressing plate and the tensile specimen mold together to form a whole mold, fixing the whole mold on a vibration platform of a vibration device through pressing strip to ensure that the whole mold vibrates at a same frequency as the vibration platform;

turning on the vibration device to vibrate the whole mold, during vibration of the vibration device, a bubble in the structural adhesive is subjected to force of a vibration field, and a balance relationship of a pore of the structural adhesive is as follows:

$$P_v - P_r - P_{vibr} = \frac{k\sigma_v}{R_v},$$

wherein $P_v$ represents an internal pressure of the pore, $P_r$ represents a hydrostatic pressure, $P_{vibr}$ represents a pressure caused by the vibration field, k represents a surface tension coefficient, $\sigma_v$ represents a pore surface tension, $R_v$ represents a radius of the pore;

after the vibration is finished, turning on an electric heating function of the vibration device to heat the whole mold from the environment temperature to a predetermined temperature range of 55° C. to 60° C. at a heating rate of 1° C./min, and keep warm at the temperature 60° C. for 480 minutes; then cooling with the vibration device, and finally performing demolding and obtaining the tensile specimen of the structural adhesive after vibration curing.

2. The method according to claim 1, wherein a stirring temperature is within a temperature range of 25° C. to 35° C., time for stirring the colloid mixture is within a range of 5 minutes to 10 minutes.

3. The method according to claim 2, wherein the environment temperature for the vibration device is within 25° C. to 35° C., the vibration duration is within 30 minutes to 60 minutes, and a vibration acceleration is within 5 g to 10 g, g represents gravitational acceleration.

4. The method according to claim 1, wherein using a vibration curing device for preparing a tensile specimen of an epoxy structural adhesive, comprises the vibration device, the tensile specimen mold, the pressing plate, the plurality of buckles and the pressing strip, the vibration device comprising a vibration platform with a heating function, the tensile specimen mold is arranged on the vibration platform, and a plurality of molding grooves for molding the tensile specimen of the structural adhesive are provided in the tensile specimen mold, a plurality of buckle grooves is symmetrically provided at a bottom of both sides of the tensile specimen mold, the pressing plate is arranged on a top surface of the tensile specimen mold, the plurality of buckles are used to fix the pressing plate tightly on the tensile specimen mold, both ends of each of the plurality of the buckles are provided with a clamping blade for engaging with each of the plurality of the buckle grooves, the plurality of buckles are arranged on the pressing plate so that the pressing plate and the tensile specimen mold form a whole mold, the pressure strip is arranged on a top of the whole mold and is used to fix the whole mold to the vibration platform.

5. The method according to claim 4, wherein a top surface of the vibration platform is provided with a plurality of first mounting holes for mounting the whole mold, and two ends of the pressure strip are respectively provided with second mounting holes for matching with the first mounting holes, and the pressure strip is fixedly connected to the vibration platform by bolts.

6. The method according to claim 4, wherein the plurality of the molding grooves are arranged in parallel and spaced apart, and a length direction of the molding grooves is consistent with a length direction of the tensile specimen mold; a plurality of the buckles are arranged in parallel and spaced apart on the pressing plate, and a length direction of the buckles is parallel to a width direction of the tensile specimen mold.

7. The method according to claim 4, wherein a surface of the pressing plate that contacts the tensile specimen mold is sprayed with 2 or 3 layers of the release agent.

\* \* \* \* \*